United States Patent
Beathard

(10) Patent No.: US 7,072,354 B1
(45) Date of Patent: Jul. 4, 2006

(54) TOKEN REGISTRATION OF MANAGED DEVICES

(75) Inventor: Roger V. Beathard, McKinney, TX (US)

(73) Assignee: Cisco Technology, Inc., San Jose, CA (US)

( * ) Notice: Subject to any disclaimer, the term of this patent is extended or adjusted under 35 U.S.C. 154(b) by 979 days.

(21) Appl. No.: 09/970,065

(22) Filed: Oct. 3, 2001

(51) Int. Cl.
*H04L 12/413* (2006.01)

(52) U.S. Cl. ........................ 370/447; 370/450; 370/462

(58) Field of Classification Search ........ 370/229–238, 370/412–418, 445, 447, 450, 468
See application file for complete search history.

(56) References Cited

U.S. PATENT DOCUMENTS

| 5,493,569 | A | * | 2/1996 | Buchholz et al. | 370/442 |
|---|---|---|---|---|---|
| 6,112,087 | A | | 8/2000 | Tayloe | 455/435 |
| 6,199,124 | B1 | * | 3/2001 | Ramakrishnan et al. | 710/40 |
| 6,516,369 | B1 | * | 2/2003 | Bredin | 710/111 |
| 6,529,520 | B1 | * | 3/2003 | Lee et al. | 370/442 |
| 6,563,809 | B1 | | 5/2003 | Proctor, Jr. et al. | 370/335 |
| 6,654,346 | B1 | * | 11/2003 | Mahalingaiah et al. | 370/235 |
| 6,700,899 | B1 | * | 3/2004 | Cao | 370/450 |
| 6,778,829 | B1 | | 8/2004 | McDonald et al. | 455/435.1 |
| 6,819,652 | B1 | * | 11/2004 | Akhtar et al. | 370/230 |
| 6,826,160 | B1 | * | 11/2004 | Wang et al. | 370/329 |
| 6,917,628 | B1 | * | 7/2005 | McKinnin et al. | 370/468 |
| 6,961,857 | B1 | | 11/2005 | Floryanzia | 713/201 |
| 2002/0154655 | A1 | * | 10/2002 | Gummalla et al. | 370/468 |
| 2002/0194345 | A1 | * | 12/2002 | Lu et al. | 709/227 |
| 2003/0018606 | A1 | * | 1/2003 | Eshel et al. | 707/1 |

* cited by examiner

*Primary Examiner*—Dang Ton
*Assistant Examiner*—Michael J Moore
(74) *Attorney, Agent, or Firm*—Baker Botts L.L.P.

(57) ABSTRACT

A communication system includes a controller for managing a number of communications devices. The controller receives registration requests from the devices and selectively registers the devices based on various factors. The controller may support a token registration process by which a device requests a token and, in response to the controller granting a token, registers with the controller using a token registration request.

32 Claims, 5 Drawing Sheets

| DEVICE NAME | ADDRESS | DIRECTORY NAME |
|---|---|---|
| STA<MAC> | 10.35.127.133 | 1001 |
| SEP003094C38479 | 10.35.127.134 | ROGER |
| JOEY | 443296D81234 | 5001 |
| roger@cisco | 10.35.128.001 | 1002,461 |
| bill@cisco | 10.35.128.002 | 1003,461 |
| STA123456X12345 | 10.35.128.003 | 1004,461 |
| GATEWAY0037 | 987654D12345 | DALLAS 01 |
| ... | ... | ... |
| SFP <MAC> | 10.35.128.014 | 2001 |

TOKEN REGISTRATION OF MANAGED DEVICES

TECHNICAL FIELD OF THE INVENTION

This invention relates generally to the field of communications and, more specifically, to token registration of managed devices.

BACKGROUND OF THE INVENTION

Historically, telecommunications involved the transmission of voice and fax signals over a network dedicated to telecommunications, such as the public switched telephone network (PSTN) or a private branch exchange (PBX). Data networks, which may include a local area network (LAN), wide area network (WAN), or a global distributed network such as the Internet, may also provide telecommunications services, such as packet-based telecommunications. One type of packet-based telecommunications architecture includes a number of end-user devices managed by a controller that establishes, maintains, and terminates communication sessions among the different devices.

To participate in a communication session, end user devices typically register with a controller. When the controller becomes unavailable due to equipment malfunction or network congestion, registered devices may seek a backup or secondary controller to receive communication services. When the primary controller becomes available, many of the devices may try to re-establish registration at nearly the same time, placing an extreme registration load on the primary controller.

SUMMARY OF THE INVENTION

In accordance with the present invention, token registration of managed devices substantially eliminates or reduces disadvantages or problems associated with previously developed systems and methods.

In one embodiment of the present invention, a method for managing registration requests from devices, performed at a controller, receives a token request from a device, determines a registration load on the controller, and grants a token to the device in response to the registration load. The method further receives a token registration request from the device and stores the token registration request in a registration queue upon determining that the device has been granted the token.

Embodiments of the present invention provide various technical advantages. Existing systems may produce an extreme and unmanageable registration load on a controller that becomes available after a previous failure. Depending on the number of devices attempting to re-register with their primary controller, the processing resources required to register a device, or the time to perform the registration process, the initial registration load on a controller upon becoming available may cause registration delays and a degradation in service to the devices.

In one embodiment of the present invention, the controller includes a registration queue that stores registration requests in a priority order. Depending on the type of registration request (e.g., token registration request, initial registration request, priority device registration request), the controller stores the registration requests at a suitable priority to optimize the registration resources of the controller. For example, a token registration request may have higher priority than an initial registration request, but a lower priority than a priority device registration request. By intelligently managing the different types of registration requests, the controller can maintain a priority-based registration queue and meter out registration services in an organized fashion. This is especially important when a controller receives more registration requests than it can process, for example, when the controller becomes available after a prior failure.

Other technical advantages of the present invention include a particular token registration scheme that allows the controller to grant or deny requests to register based on the current registration load of the controller. The registration load may be a processor load of the controller, a number of registration requests stored in the registration queue, or other suitable factors. Upon denying a token, the controller may include a retry time that indicates when the device should communicate another token request. Upon granting a token, the controller may include a time-out that determines how soon the device must then communicate a registration request.

Other technical advantages of the present invention will be readily apparent to one skilled in the art from the following figures, description, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
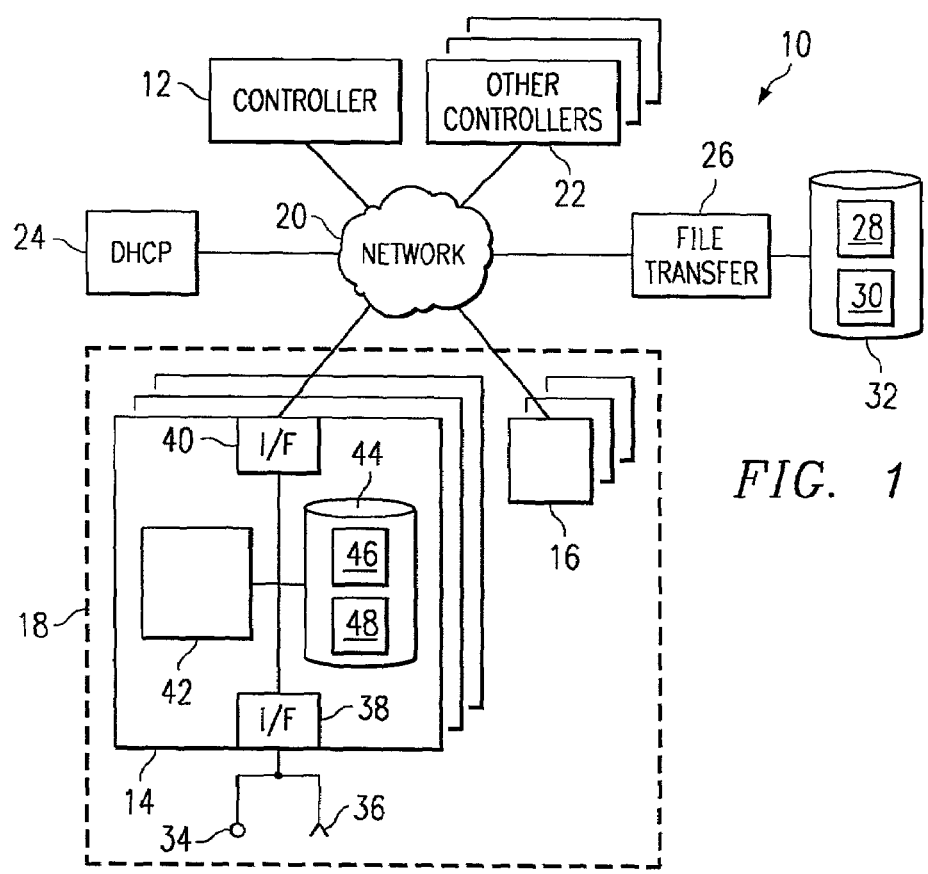
FIG. 1 illustrates a system that includes a controller and a number of devices that can register with the controller in accordance with the present invention.

FIG. 1 illustrates a communication system, indicated generally at 10, that includes a controller 12 coupled to end user devices 14, and gateway devices 16 (collectively referred to as managed devices 18) using network 20. In general, controller 12 receives registration requests from devices 18, and selectively registers devices 18 based on registration load, device priority, or other factors.

In addition to controller 12, devices 18, and network 20, system 10 also includes other controllers 22, a dynamic host configuration protocol (DHCP) module 24, and a file transfer module 26. Communications between elements of system 10 take place using network 20. Thus, network 20 represents any suitable collection and arrangement of components for providing communications between various elements. For example, network 20 may include one or more local area networks (LANs), wide area networks (WANs), elements of the public switched telephone network (PSTN), and portions of a global communications network, such as the Internet. According to a particular embodiment, network 20 supports packet-based communications, such as voice over Internet protocol (VOIP) communications sessions involving end-user devices 14, with these sessions managed by controller 12 and 22.

Controllers 12 and 22 represent hardware and associated logic for managing devices 18 to provide communication services for end users through end-user devices 14. According to particular embodiments, controllers 12 and 22 represent call managers for controlling packet-based communications sessions for end-user devices 14. During operation, controller 12 (and potentially other controllers 22) selectively registers devices 18 based on factors such as registration load and device priority. The elements and operation of controller 12 are described in greater detail with respect to other illustrations.

Other elements of system 10 also provide services to support communications for end-user devices 14. DHCP module 24 provides centralized management of addressing information for devices 18. For example, DHCP module 24 may maintain information such as subnet masks, default router information, domain name server (DNS) addresses and IP addresses for assignment to devices 18. DHCP module 24 provides selected portions of this information to devices 18 at appropriate times. For example, in response to a broadcast message from one of end-user devices 14 requesting assignment of an IP address, DHCP module 24 may assign an IP address and communicate this address to the requesting end-user device 14. In addition, DHCP module 24 may supply a requesting device 18 addresses of other components, such as file transfer module 26, to permit the requesting device 18 to access additional configuration information maintained by these other elements.

File transfer module 26 provides centralized management of configuration information for use by devices 18. In the embodiment illustrated, file transfer module 26 maintains firmware information 28 and controller information 30 within a memory 32. Firmware information 28 represents logic for use by end-user devices 14 during operation. For example, end-user device 14 may be a "shell" that requires downloaded logic routines to control its operation, and, during setup, end-user device 14 may download an appropriate firmware version from firmware information 28 to control its operation. Controller assignment information 30 includes assignments of primary and backup controllers for devices 18. For example, controller assignment information 30 may include assignments of a primary, secondary, and tertiary controllers 12 or 22 for some or all of devices 18. Devices 18 use these controller assignments to determine an appropriate controller 12 or 22 with which to attempt to register. After registration, controller 12 or 22 may handle additional configurations of devices 18. Thus in summary, DHCP module 24 and file transfer module 26 support initial configurations of devices 18 prior to these devices 18 registering with one of controllers 12 or 22, and, after registration, controllers 12 and 22 provide communications services to end users through management of end-user devices 14 and gateway devices 16.

Gateway devices 16 represent network elements providing links between various communications networks. For example, gateway devices 16 may interconnect network 20 with other communications networks, such as the Internet, the PSTN, and other LANs or WANs. Thus, gateway devices 16 provide for translation and formatting of communications between these various networks. For example, a selected gateway device 16 may couple to the PSTN and provide for communication sessions between packet-based end-user devices 14 and traditional analog telephones or other equipment couple to the PSTN.

End-user devices 14 represent hardware and associated logic for interfacing with end users to provide communications services, such as packet-based telephony services. In the embodiment illustrated, end-user device 14 supports voice communications using a microphone 34 and a speaker 36. End-user device 14 further includes a user interface 38, a network interface 40, a controller 42, and a memory 44. User interface 38 couples to microphone 34 and speaker 36 and handles functions such as coding and decoding of signals to convert between analog signals communicated to and from and end user and digital signals used by end-user device 14. Network interface 40 includes any suitable hardware and associated logic for coupling end-user device 14 to network 20. For example, network interface 40 may include an RJ45 connector for interfacing with an Ethernet network.

Using information maintained within memory 44, controller 42 manages the operation of end-user device 14 to support communications for end users. During operation, controller 42 may access, store, and maintain various information within memory 44, such as code 46 and operational data 48. Code 46 represents software, firmware, or other suitable logic used by controller 42 for the initialization of end-user device 14. For example, code 46 may include instructions for initialization that permit controller 42 to broadcast requests for information and configurations from other elements in system 10, such as DHCP module 24. Operational data 48 represents information received by end-user device 14, such as addressing information received from DHCP module 24, firmware versions and controller assignments received from file transfer module 26, and any other suitable configuration information received by end-user device 14.

At startup, end-user device 14 initializes information in memory 44 and establishes itself under the management of one of controllers 12 or 22. End-user device 14 may begin startup in response to any suitable event, such as when powered up, plugged into network 20, or reset. During initialization, end-user device 14 contacts other elements within system 10 to obtain operational data 48. For example, end-user device 14 may broadcast a request for a device address and, in response, receive an assigned address from DHCP module 24. Similarly, end-user device 14 may contact file transfer module 26 to obtain information, such as firmware information 28 and controller assignment information 30.

Using controller assignments received from file transfer module 26, end-user device 14 attempts to establish itself under the management of one of controllers 12 or 22. In the embodiment illustrated, controller 12 is assigned as the primary controller for devices 18. Thus, end-user device 14 initially attempts to establish itself under the management of controller 12. To accomplish this, end-user device 14 communicates an initial registration request to controller 12. In normal operation, when controller 12 is available, end-user device 14 receives an acknowledgment from controller 12 indicating a successful registration. As a result of a successful registration, end-user device 14 may begin receiving and placing calls to other communications devices.

However, if controller 12 is unavailable or fails to respond to the initial registration request, controller assignment information 30 received from file transfer module 26 may identify one or more of other controllers 22 as backup controllers. If so, end-user device 14 registers with a backup controller using a process similar to that for the attempted registration with the primary controller. End-user device 14 may continue trying backup controllers until receiving service or until all options are exhausted.

While receiving service from a backup controller or after failing to receive service from any of controllers 12 or 22, end-user device 14 monitors for the availability of controller 12 (the assigned primary controller). For example, while receiving service from one of other controllers 22, end-user device 14 may periodically ping controller 12 to determine its availability.

Upon determining the availability of controller 12, end-user device 14 attempts to reestablish itself under the management of controller 12. However, because many of devices 18 may attempt to contact controller 12 immediately upon its availability, end-user device 14 attempts to register with controller 12 using a process designed to minimize the impact on continuity of services. Thus, while remaining under the management of other controller 22, end user device 14 requests a token from controller 12. If granted, the token indicates a high probability that controller 12 can successfully register end-user device 14.

Upon receiving a token from controller 12, end-user device 14 communicates a token registration request to controller 12. This token registration request, if timely communicated, places end-user device 14 into a registration queue within controller 12. Controller 12 services requests in the registration queue according to priorities, with token registration requests taking priority over other devices 18 having only initial registration requests. Thus, controller 12 grants higher priority to registrations requests for devices attempting to "rehome" from one of other controllers 22 than devices attempting to initially register.

While the embodiment illustrated and the preceding description focus on a particular embodiment for end-user device 14 that contains specific elements, system 10 contemplates end-user device 14 having any suitable combination and arrangement of functional elements for providing communications services under the management of one of controllers 12 or 22 and, further, for registering with controller 12 using a token registration technique when appropriate. Moreover, while the embodiment illustrates system 10 including separate elements for centralizing various initialization and configuration tasks, system 10 contemplates any suitable separation or distribution of these functionalities. For example, some or all of the functionalities of DHCP module 24 and file transfer module 26 may be implemented by a single unit or integrated within one or more of devices 18 or controllers 12 and 22.

Figure 2:
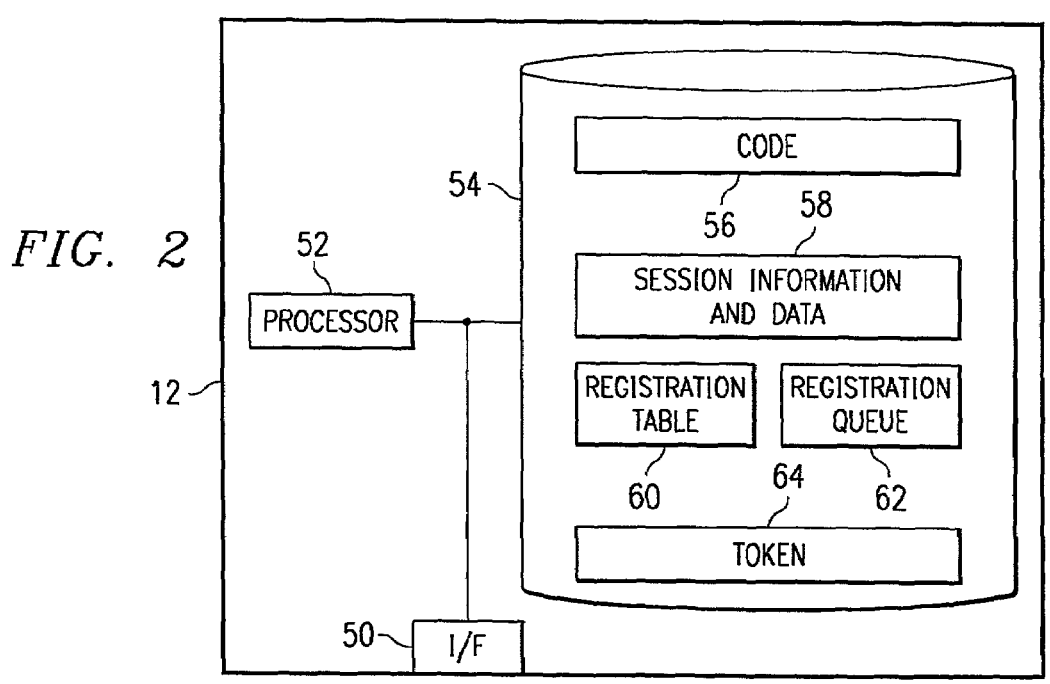
FIG. 2 is a block diagram illustrating exemplary components of the controller.

FIG. 2 is a block diagram illustrating functional components of an exemplary controller 12 that includes a network interface 50, a processor 52, and a memory 54. In general, controller 12 manages communication services for devices 18 and responds to registration requests and selectively registers devices 18 based on factors such as priorities of requests and loading of processor 52.

In the embodiment illustrated, network interface 50 couples controller 12 to network 20 while processor 52, using information maintained in memory 54, manages the operation of controller 12. To support the operation of processor 52, memory 54 maintains code 56, session information and data 58, a registration table 60, a registration queue 62, and token information 64. Code 56 represents software, firmware, or other appropriate logic for execution by processor 52. Session information and data 58 includes various information for managing communications services for registered devices 18 and for handling registration requests from these devices 18. For example, session information and data 58 may include information tracking ongoing communication sessions between registered devices 18 and other communications devices. In addition, session information and data 58 may include parameters, criteria, and other data for use by controller 12 in responding to registration requests from devices 18.

Registration table 60 maintains information tracking devices 18 currently registered with controller 12. For example, for each registered device 18, registration table 60 may include a device name, an internal address for delivering communications, and an external address, such as a phone number, assigned to the registered device 18. Registration queue 62 maintains a list of devices 18 that have requested service but have not yet been registered and placed into registration table 60. Token information 64 includes data tracking outstanding tokens. For example, in response to a token request, controller 12 may grant a token and generate an entry in token information 64. These entries may track information such as token identifiers, addresses of requesting devices 18, and timestamps or other timing mechanisms for tracking the time a token remains outstanding. In short, information maintained in memory 54 allows controller 12 to manage services for devices 18 and respond to various registration requests from devices 18. However, while the embodiment illustrated includes specific examples for information maintained within memory 54, system 10 contemplates controller 12 maintaining any suitable information in any appropriate format for use in managing communications services and handling various types of registration requests from devices 18.

In operation, controller 12 provides selective registration of devices 18 based on the registration requests received. According to particular embodiments, controller 12 uses tokens to manage registration requests from devices 18. That is, controller 12 issues (or denies to issue) tokens to manage the number of devices 18 attempting to register. For the token registration process, devices 18 wishing to register initially request a token from controller 12. In response, controller 12 may grant or deny the token request based on criteria, such as the number of devices 18 already in registration queue 62 or the current load on processor 52. For example, if the number of devices 18 currently in registration queue 62 exceeds a threshold, controller 12 may deny subsequent token requests received from other devices 18. When denying a token request from device 18, controller 12 may identify a retry time that indicates when a requesting device 18 should communicate another token request. Thus, controller 12 may delay subsequent token requests from devices 18, and further, controller 12 may stagger retry times in order to distribute token request over time.

Upon determining to grant a token request, controller 12 communicates a token to the requesting device 18 and updates token information 64 to reflect the token granted to the requesting device 18. To prevent tokens from remaining outstanding indefinitely, controller 12 may limit the time that a token remains valid once granted. According to particular embodiments, controller 12 determines a timeout value and, when granting a token request, communicates this timeout value along with the granted token. This timeout indicates the amount of time that the requesting device 18 has to respond to the granted token before the token becomes invalid. Controller 12 may use any suitable techniques for determining timeout values, such as preset or dynamically determined values. Moreover, while controller 12 may communicate a timeout value to the requesting device 18, controller 12 may use implicit timeouts without informing the requesting device 18. For example, granted tokens may remain valid for a set period of time, and controller 12 may or may not communicate this timeout value to the requesting device along with the token.

Once controller 12 has granted a token, device 18 may use the token in a registration request. Upon receiving a token registration request from device 18, controller 12 determines the validity of the token in the request. For example, controller 12 may determine that the token is valid only if the token registration request is timely received. Upon determining that the token registration request is valid, controller 12 places the requesting device 18 into registration queue 62. When appropriate, controller 12 selects the requesting device 18 from registration queue 62, performs steps for registering the requesting device 18, and places device 18 into registration table 60 after a successful registration process. Controller 12 may then inform device 18 whether or not a successful registration has occurred. Thus, according to particular embodiments, devices 18 may register with controller 12 using a two-step process that involves a token request and a token registration request after receiving a token.

Controller 12 also supports other types of registration requests. According to particular embodiments, controller 12 receives token registration requests in addition to initial registration requests and priority registration requests. Devices 18 typically use initial registration requests when initially attempting to register with controller 12. For example, at startup, device 18 may attempt to register with controller 12 using an initial registration request. If this request fails, as previously discussed, device 18 then attempts to register with a backup controller 12 or 22.

Devices 18 generally use token registration requests when reattempting to register with controller 12 after first failing to register with controller 12. For example, after an initial registration request has failed, device 18 may attempt to use the token registration request process to register with controller 12. Likewise, devices 18 may use the token registration request process when rehoming with controller 12.

Some or all of devices 18 may also use priority registration requests. These registration requests may include tags or other indicators specifying a high priority for the registration request. Alternatively, registration requests from selected devices 18 may automatically receive priority status. For example, gateway devices 16 may be granted priority in registration since they are shared resources providing access to other networks.

Controller 12 accepts and prioritizes these various types of registration requests within registration queue 62, thus providing priority-based processing of registration requests. According to a particular embodiment, controller 12 processes priority registration requests first, then processes pending token registration requests, and finally processes initial registration requests. However, system 10 contemplates controller 12 using different and/or more complex algorithms for processing various types of registration requests. For example, controller 12 may use a combination of priority and time waiting in registration queue 62 to select the registration request to process. Thus controller 12 may use any suitable techniques and criteria for selecting requests from registration queue 62 to process and may accommodate any number of various priorities for registration requests.

Moreover, while the particular embodiment illustrated and the preceding description focus on a particular combination and arrangement of functional elements within controller 12, system 10 contemplates controller 12 including any appropriate combination and arrangement of elements for processing multiple types of registration requests from devices 18. Thus, the specific elements illustrated and functionalities described may be separated, combined, rearranged, or otherwise modified, and any of these functionalities may be implemented using logic encoded in media.

Figures 3, 4:
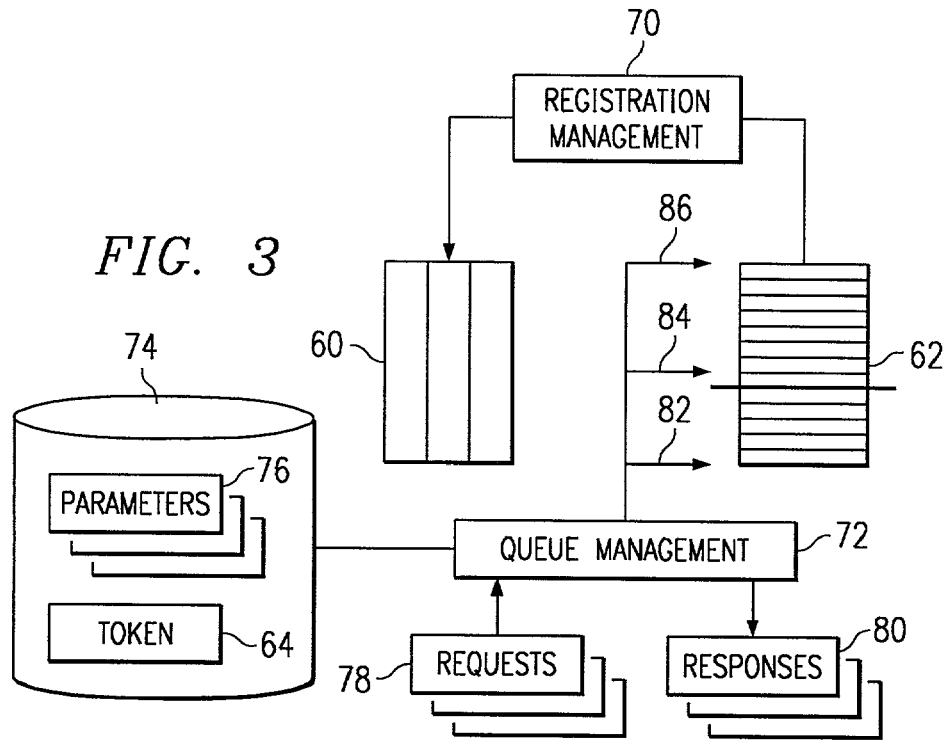
FIG. 3 is a block diagram illustrating in more detail components of the controller that manage registration requests.
FIG. 4 is an exemplary registration table maintained by the controller.

FIG. 3 is a block diagram illustrating in greater detail various functional elements of controller 12 that manage registration requests. These elements of controller 12 include registration table 60, registration queue 62, a registration management module 70, a queue management module 72, and a memory 74 maintaining parameters 76 and token information 64. In general, these elements of controller 12 handle queuing and processing of various registration requests. More specifically, these elements handle queuing of various priorities of registration requests and processing of the queued requests.

Queue management module 72 interfaces with devices 18 to receive requests 78 and to generate responses 80. Requests 78 may include token requests, token registration requests, initial registration requests, priority registration requests, and potentially other types of requests supported by controller 12. Responses 80 grant and deny token requests, grant and deny registration requests, and may further provide information on processing of granted registration requests. In general, queue management module 72 handles the receipt and processing of requests 78 from devices 18 by granting or denying these requests, providing appropriate responses 80 and placing granted requests into registration queue 62.

In operation, queue management module 72 processes requests 78 according to their type. For token requests, queue management module 72 accesses parameters 76 to determine whether or not to grant the token request. Parameters 76 includes information for use by queue management module 72 in processing various requests. For example, parameters 76 may include measurements, such as the depth of registration queue 62 and the usage of processor 52, thresholds for comparison to various measurements, and other appropriate information and/or criteria for use by queue management module 72 in processing requests 78.

Upon determining not to grant a token, queue management module 72 generates response 80 indicating the denial of the token request. As previously discussed, controller 12 may include a retry time within the denial that indicates when device 18 should reattempt a token request. Alternatively, queue management module 72 may deny a token request by simply discarding the request and not responding to the requesting device 18. If, however, controller 12 determines to grant the token request, queue management module 72 updates token information 64 with the appropriate information and generates response 80 granting the token to the requesting device 18. Thus, queue management module 72 responds to a token request by either granting or denying the request.

Upon receiving an initial registration request, queue management module 72 accesses parameters 76 to determine whether or not to place the requesting device 18 into registration queue 62. For example, if registration queue 62 contains greater than a threshold number of requests or usage of processor 52 exceeds some threshold, queue management module 72 may deny the initial registration request. To deny the request, queue management module 72 generates response 80 indicating the denial and may further indicate in response 80 a retry time that indicates when the requesting device 18 should reattempt to register. As with the denial of the token request, queue management module 72 may deny an initial registration request by dropping the request and not responding to the requesting device 18. If queue management module 72 determines to grant the initial registration request, queue management module 72 places the requesting device 18 into registration queue 62 at the lowest priority, as indicated at 82. Upon granting the initial registration request, queue management module 72 may also generate response 80 to inform the requesting device 18 that the request has been granted.

Upon receiving a token registration request, queue management module 72 accesses token information 64 to determine whether the request identifies a valid token. For example, queue management module 72 may determine whether device 18 has indicated a token in token information 64 and whether the identified token has expired. Queue management module 72 may further access parameters 76 to determine whether or not to grant the token registration request. For example, if parameters 76 indicate that the capacity of controller 12 has further degraded since granting a token to the requesting device 18, queue management module 72 may deny the token registration request. Thus, even after granting a token and receiving a valid token registration request, queue management module 72 may still deny the token registration request. If queue management module 72 determines to grant the token registration request, it places device 18 into registration queue 62 at a priority above initial registration requests, as indicated at 84. Upon granting or denying the token registration request, queue management module 72 may generate response 80 to inform the requesting device 18 of its status.

Upon receiving a priority registration request, queue management module 72 may automatically enter the requesting device 18 into registration queue 62 with a priority higher than token registration requests, as indicated at 86. Queue management module 72 may then indicate the granting of the priority registration request in response 80 communicated to the requesting device 18. However, queue management module 72 may use information, such as parameters 76, to determine whether or not to grant a priority registration request. Thus, similar to initial registration requests and token registration requests, queue management module 72 may access parameters 76 to determine whether or not to grant a priority registration request. However, queue management module 72 may impose different criteria when determining whether to grant or reject various types of registration requests. Thus, a token registration request may be granted under circumstances in which an initial registration request would be rejected, and similarly, a priority registration request may be granted under circumstances in which a token registration request would be rejected.

Queue management module 72 may identify priority registration requests using any suitable criteria. For example, the requesting device 18 may indicate a high priority for the request, or queue management module 72 may automatically treat requests as priority requests for any suitable reasons. Thus, for example, upon receiving an initial registration request or a token registration request from a "critical" device 18, queue management module 72 may treat the request as a priority registration request.

While queue management module 72 handles the queuing of requests into registration queue 62 and interactions with devices 18, registration management module 70 handles the selection and processing of requests from registration queue 62. Thus, registration management module 70 selects and processes registration requests from registration queue 62 and populates registration table 60 with information of devices 18 after processing their registration requests. To select from registration queue 62, registration management module 70 may use any appropriate selection criteria. For example, registration management module 70 may select the highest priority, first-received registration request that remains in registration queue 62. However, to prevent higher priority requests from blocking the processing of lower priority requests, registration management module 70 may use any suitable queue processing techniques.

After selecting a request from registration queue 62, registration management module 70 registers device 18 under the management of controller 12. For example, registration management module 70 may assign one or more phone lines to device 18, determine an appropriate template for use by device 18, and establish voicemail services for device 18. The lines assigned to device 18 provide external addresses, such as phone numbers, by which device 18 may be called. For a voicemail setup, registration management module 70 may establish voicemail mailboxes or link device 18 to existing voicemail mailboxes and perform other suitable tasks for initializing voicemail services for device 18. The template selected for device 18 permits controller 12 to control the features and functions to be provided by device 18. For example, end user devices 14 may operate as shells in which a template defines the operation of various controls and buttons to provide users access to various services. Thus, registration management module 70 may select and/or generate an appropriate template corresponding to the various services, such as line assignments and voicemail services, granted to device 18.

During registration, registration management module 70 also provides configuration information to device 18. For example, registration management module 70 may communicate a registration acknowledgment to device 18 identifying the various services determined for device 18 during the registration process. For example, the registration acknowledgment may indicate the assigned lines, voicemail setups, and template for use by device 18.

In addition to providing an acknowledgment to device 18, registration management module 70 enters device 18 into registration table 60. According to particular embodiments, the entry in registration table 60 identifies the name of device 18, an internal address for device 18, and external addresses for device 18. The internal address identifies how to communicate information to device 18. For example, the internal address may be an IP address, a media access control (MAC) address, or other suitable address for directing communications to device 18. The external address or addresses represent the addresses generally presented to end users, such as phone numbers assigned to device 18 during registration. Thus, controller 12 uses registration table 60 to map internal and external addresses associated with devices 18.

While the particular embodiment illustrated and the preceding description focus on a particular combination and arrangement of functional elements, system 10 contemplates controller 12 including any appropriate combination and arrangement of elements for receiving, processing, and responding to various types of registration requests received from devices 18. Thus, specific elements illustrated and functionalities described may be separated, combined, rearranged, or otherwise modified. For example, controller 12 may implement registration queue 62 as multiple queues, with each queue servicing a different priority of registration requests. Therefore, as illustrated by this example, the embodiments described are merely illustrative, and system 10 contemplates controller 12 using any suitable techniques for processing multiple types of requests from devices 18.

FIG. 4 illustrates a particular example of registration table 60. In the example illustrated, registration table 60 includes a number of entries for registered devices 18 and, for each device 18, indicates a device name, an address, and a directory name. The address in registration table 60 identifies the internal address for device 18 used by controller 12 and other communications devices to communicate information with device 18. The directory name indicates one or more external addresses used to identify and/or place calls to device 18. For example, for end user devices 14, the directory may indicate one or more assigned telephone numbers. For gateway devices 16, the directory name may indicate a group of communications devices, such as end user devices 14, accessed through gateway device 16. Thus, as indicated by this example, registration table 60 permits controller 12 to manage various registered devices 18. However, system 10 contemplates controller 12 maintaining any suitable information for managing communications and services for devices 18.

Figure 5:
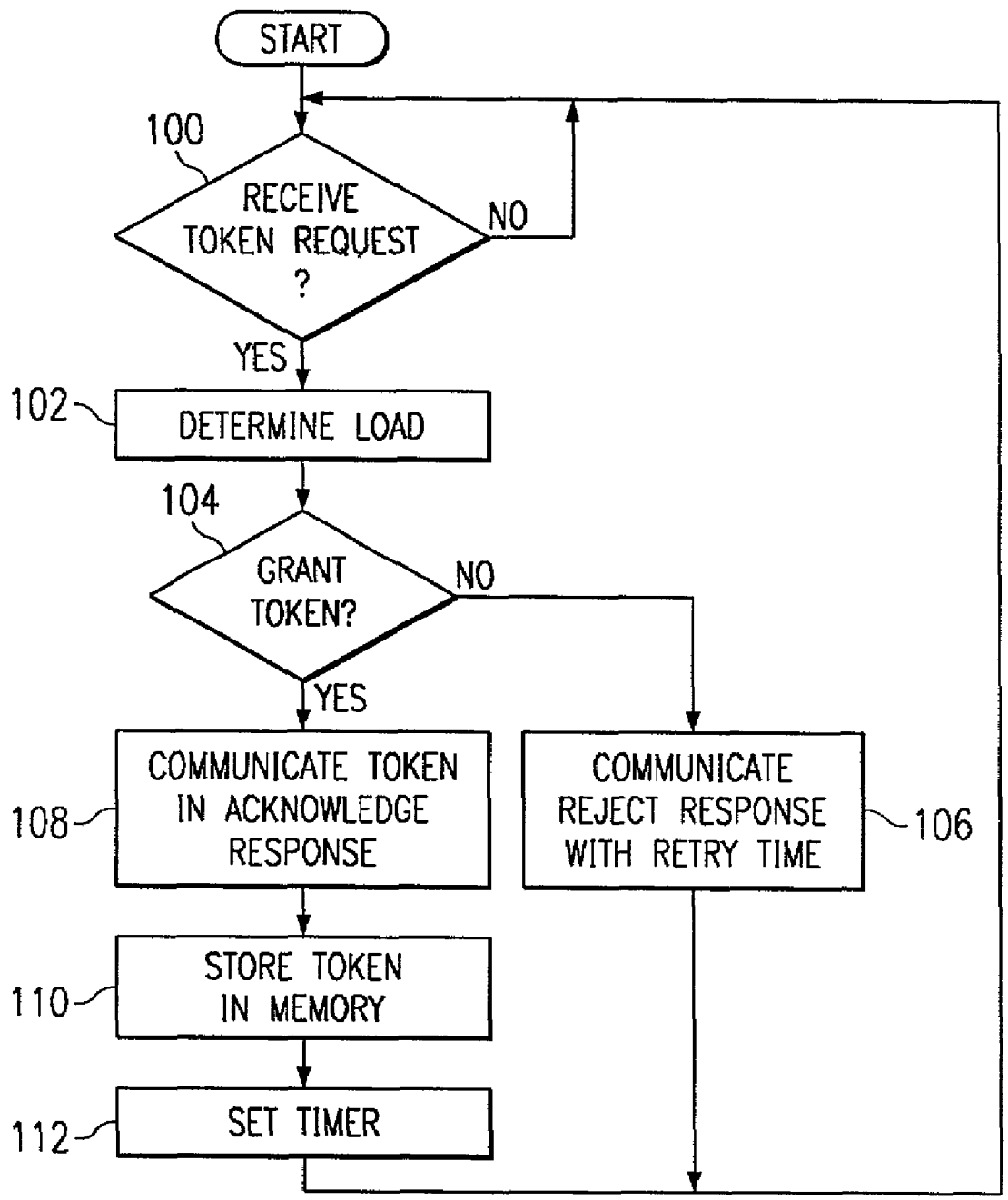
FIG. 5 is a flowchart illustrating a method performed by the controller to process token requests.

FIG. 5 is a flowchart illustrating a method performed by controller 12 to process token requests. Controller 12 monitors communications from devices 18 at step 100. When a token request is received, controller 12 determines its load at step 102. This may include determining current and/or recent usage of various components within controller 12, such as usage of processor 52 and the number of outstanding requests in registration queue 62. Based on the various parameters determined, controller 12 determines whether or not to grant a token at step 104. Upon determining not to grant a token, controller 12 communicates a response indicating the rejection and a retry time at step 106. As previously discussed, the retry time indicates how long the requesting device 18 should wait before reattempting to request a token.

Upon determining to grant a token, controller 12 communicates a token in an acknowledgment response at step 108. In addition, controller 12 stores the token in token information 64 and sets appropriate timers at steps 110 and 112, respectively. Storing the token permits controller 12 to appropriately identify and validate received token registration requests, and setting the timer allows the granted token to expire after some period of time.

Thus, this flowchart presents a simplified exemplary method for responding to a token request from one of devices 18. However, this flowchart illustrates only an exemplary method of operation, and controller 12 may use any suitable techniques for responding to token requests from devices 18. Thus, many of the steps in this flowchart may take place simultaneously and/or in different orders than as shown. In addition, server 36 may use methods with additional steps, fewer steps, and/or different steps, so long as the methods remain appropriate.

Figure 6:
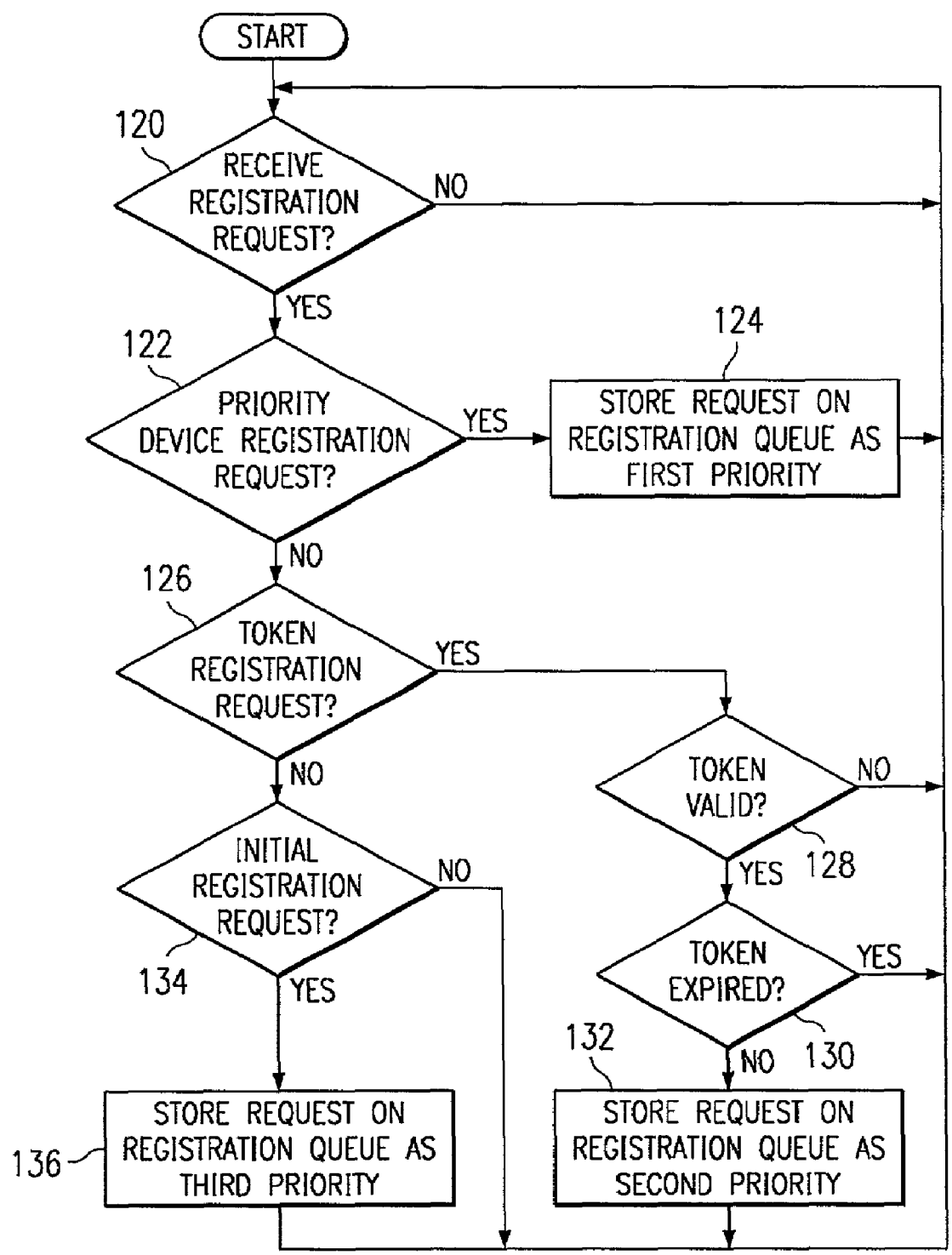
FIG. 6 is a flowchart illustrating a method performed by the controller to manage registration requests.

FIG. 6 is a flowchart illustrating a method performed by controller 12 to manage registration requests. Controller 12 monitors whether or not a registration request has been received at step 120. If so, controller 12 determines whether the request is a priority registration request at step 122. For example, as previously discussed, controller 12 may automatically treat requests received from selected devices 18 as priority registration requests. Registration requests may also include priority information controller 12 to identify the priority of the registration request. If the request is a priority registration request, controller 12 stores the request on registration queue 62 in the highest priority at step 124 and returns to monitoring for registration requests.

If the request is not a priority registration request, controller 12 determines whether the request is a token registration request at step 126. For example, controller 12 may determine whether the request includes a token or whether the requesting device 18 matches an entry in token information 64. If the request is a token registration request, controller 12 determines whether the request identifies a valid token at step 128. For example, controller 12 may determine whether the identified token is stored in token information 64. If the request does not indicate a valid token, controller 12 returns to monitoring for registration requests at step 120. In addition, if the token is invalid, controller 12 may generate an error and/or communicate a response to the requesting device 18 indicating that the token is invalid. However, according to particular embodiments, if the token registration request identifies an invalid token, controller 12 may store the request on registration queue 62 as a third priority request at step 136. Thus, instead of simply disregarding invalid token registration requests, controller 12 may default improper token registration requests as third priority.

If the token registration request identifies a valid token, controller 12 determines whether the token has expired at step 130. For example, controller 12 may access a timer associated with the token or compare a "time of granting" to the current time to determine whether the token registration request was received within the timeout assigned to the particular token. If the token has expired, controller 12 returns to monitoring for registration requests at step 120. However, similar to the response to an invalid token registration request, controller 12 may respond to an expired token registration request by storing the request on registration queue 62 as a third priority request at step 136. If the token is valid and has not expired, controller 12 stores the request on registration queue 62 as a second priority request at step 132.

If controller 12 determines that the request received is not a token registration request at step 126, controller 12 determines whether the received request is an initial registration request at step 134. If not, controller 12 returns to monitoring for registration requests at step 120 and may additionally generate an error and/or communicate a response to the requesting device 18. If the request is an initial registration request, controller 12 stores the request on registration queue 62 as a third priority request at step 136. Alternatively, controller 12 may default to storing all non-priority and non-token registration requests as third priority requests at step 136.

Thus, the flowchart illustrated and the preceding description demonstrate an exemplary method of operation for controller 12 in handling various types of registration requests. However, as with the flowchart detailing the operation of controller 12 with respect to processing of token requests, this flowchart illustrates only an exemplary method of operation, and controller 12 may use any suitable techniques for processing registration requests. Thus, many of the steps in this flowchart may take place simultaneously and/or in different orders than as shown. In addition, controller 12 may use methods with additional steps, fewer steps, and/or different steps, so long as the methods remain appropriate.

Figure 7:
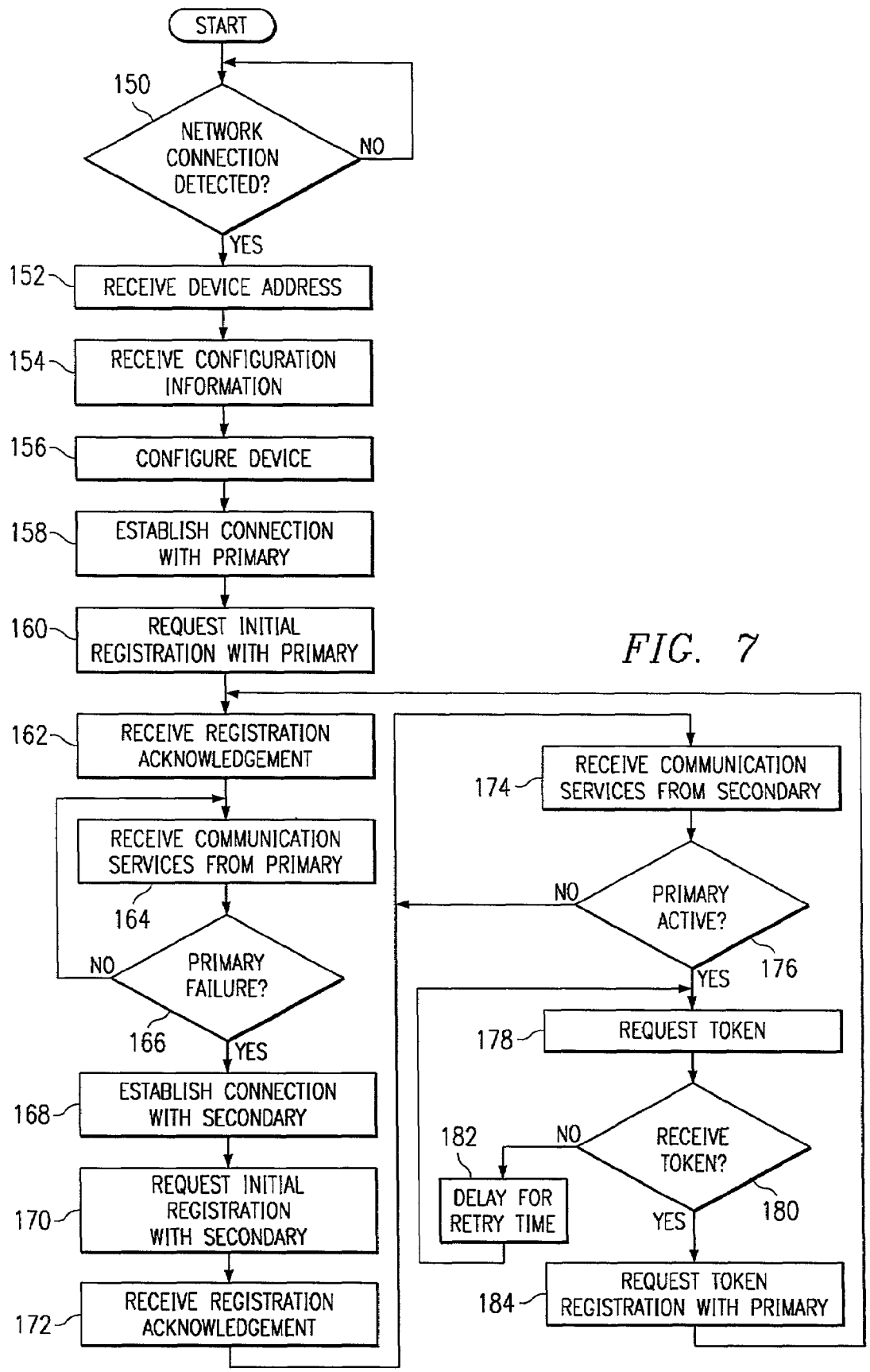
FIG. 7 is a flowchart illustrating a method performed at a device to register with one or more controllers.

FIG. 7 is a flowchart illustrating a method performed at device 18 to register with one or more controllers 12 or 22. Device 18 monitors for a network connection at step 150. For example, device 18 may monitor whether a connection between network interface 40 and network 20 has been established. Upon detecting a network connection, device 18 receives a device address at step 152. For example, device 18 may communicate a broadcast message requesting assignment of a device address, and, in response, DHCP module 24 may generate an address and communicate this assigned address to device 18.

Device 18 receives configuration information at step 154. This configuration information includes data such as firmware for execution by processor 42 and controller assignments. For example, the received configuration information may include a firmware version and identify primary, secondary, and tertiary controllers 12 and 22. Using the received configuration information, device 18 configures its components at step 156.

Device 18 establishes a connection with the primary controller identified in the received configuration information at step 158 and requests initial registration with the primary controller at step 160. For example, device 18 may establish a transmission control protocol/internet protocol (TCP/IP) session with the primary controller and communicate one or more packets indicating an initial registration request. In response to the initial registration request, device 18 receives a registration acknowledgment from the primary controller at step 162. As previously discussed, the registration acknowledgment may include additional configuration information, such as assigned lines, templates, and voicemail services information. Thus, in the example illustrated by this flowchart, the primary controller is initially available and registers device 18 in response to an initial registration request. This permits device 18 to receive communication services from the primary controller at step 164. For example, these services may permit device 18 to place and receive telephone calls and access voicemail services.

While receiving communication services, device 18 monitors for a failure of the primary controller at step 166. For example, device 18 may periodically or sporadically ping controller 12 to ensure its availability. Upon detecting a failure of the primary controller, device 18 determines a secondary controller from the configuration information. Using this information, device 18 establishes a TCP/IP connection with the secondary controller at step 168 and requests initial registration with the secondary controller at step 170. In response, device 18 receives a registration acknowledgment from the secondary controller at step 172 and receives communication services from the secondary controller at step 174. Thus, device 18 uses a process for registering with the secondary controller similar to that used for the initial registration with the primary controller.

While receiving communication services from the secondary controller, device 18 monitors whether the primary controller has become active at step 176. For example, as with monitoring for a failure of the primary controller, device 18 may periodically or sporadically ping the primary controller to determine its availability. Upon determining the availability of the primary controller, device 18 requests a token from the primary controller at step 178 and monitors for the receipt of the token at step 180. If no token is received, device 18 delays for a retry time before again requesting a token at step 178. For example, device 18 may receive a token request rejection from the primary controller that indicates a retry time for device 18 to wait before reattempting to request a token. Alternatively, device 18 may receive no response to the token request and may automatically delay for some period of time before reattempting to request a token.

Upon receiving a token from the primary controller, device 18 requests token registration with the primary controller at step 184. For example, device 18 may communicate a registration request that includes the granted token. In response, device 18 receives a registration acknowledgment from the primary controller at step 162 and begins receiving communication services from the primary controller at step 164. As before, device 18 monitors for a failure of the primary controller while receiving communication services at step 166. Thus, the preceding flowchart illustrates an exemplary method for device 18 to establish itself under the management of a primary controller, to fail over to a secondary controller upon a failure of the primary, and to rehome onto the primary controller when it becomes active again.

However, as with the preceding flowcharts, this flowchart illustrates only an exemplary method of operation, and device 18 may use any suitable techniques for registration, failover, and re-homing. Thus, many of the steps in this flowchart may take place simultaneously and/or in different orders than as shown. In addition, device 18 may use methods with additional steps, fewer steps, and/or different steps, so long as the methods remain appropriate. Therefore, the examples provided by these flowcharts are merely illustrative, and system 10 contemplates controllers 12 and 22 and devices 18 using any suitable steps for processing various types of registration requests.

Although the present invention has been described with several embodiments, a myriad of changes, variations, alterations, transformations, and modifications may be suggested to one skilled in the art, and it is intended that the present invention encompass such changes and modifications as fall within the scope of the present appended claims.

What is claimed is:

1. A method for managing registration requests from a plurality of devices, the method comprising the following steps performed at a controller:
   receiving a token request from a device;
   determining a registration load on the controller;
   granting a token to the device in response to the registration load, the token authorizing the device to submit a token registration request;
   receiving the token registration request from the device; and
   storing the token registration request in a registration queue upon determining that the device has been granted the token.

2. The method of claim 1, wherein:
   the controller comprises a call manager operable to maintain a registration table that stores an address mapping for the device upon registration; and
   the device comprises a packet-based telephony device managed by the call manager.

3. The method of claim 1, further comprising:
   receiving an initial registration request from a second device; and
   storing the initial registration request in the registration queue at a lower priority than the token registration request.

4. The method of claim 1, further comprising:
   receiving a priority device registration request from a second device; and
   storing the priority device registration request in the registration queue at a higher priority than the token registration request.

5. The method of claim 1, wherein the device comprises a first packet-based telephony device, and further comprising:
receiving an initial registration request from a second packet-based telephony device;
storing the initial registration request in the registration queue at a lower priority than the token registration request;
receiving a priority device registration request from a telephony gateway device; and
storing the priority device registration request in the registration queue at a higher priority than the token registration request.

6. The method of claim 1, further comprising processing registration requests stored in the registration queue in priority order and at a rate determined by the processing resources of the controller.

7. The method of claim 1, further comprising:
receiving a token request from a second device;
determining the registration load;
denying the token request; and
communicating to the second device a response having a retry time that indicates when the second device should communicate another token request.

8. The method of claim 1, wherein the registration load comprises at least one of the following:
a processor load of the controller; and
a number of registration requests stored in the registration queue.

9. The method of claim 1, wherein:
the token granted to the device includes a timeout; and
storing the token registration request in the registration queue further comprises storing the token registration request in the registration queue if the controller receives the token registration request prior to expiration of the timeout.

10. A method for managing registration requests from a plurality of telephony devices managed by a call manager, the method comprising the following steps performed at the call manager:
receiving a token request from a first packet-based telephony device;
determining a registration load on the call manager;
granting a token to the first packet-based telephony device in response to the registration load, the token authorizing the device to submit a token registration request;
receiving the token registration request from the first packet-based telephony device;
storing the token registration request in a registration queue upon determining that the device has been granted the token;
receiving an initial registration request from a second packet-based telephony device;
storing the initial registration request in the registration queue at a lower priority than the token registration request;
receiving a priority device registration request from a telephony gateway device;
storing the priority device registration request in the registration queue at a higher priority than the token registration request; and
processing registration requests stored in the registration queue in priority order and at a rate determined by the processing resources of the call manager.

11. The method of claim 10, further comprising:
receiving a second token request from a third packet-based telephony device;
determining the registration load;
denying the second token request; and
communicating to the third packet-based telephony device a response having a retry time that indicates when the third packet-based telephony device should communicate another token request.

12. The method of claim 10, wherein the registration load comprises at least one of the following:
a processor load of the controller; and
a number of registration requests stored in the registration queue.

13. The method of claim 10, wherein:
the token granted to the first packet-based telephony device includes a timeout; and
storing the token registration request in the registration queue further comprises storing the token registration request in the registration queue if the controller receives the token registration request prior to expiration of the timeout.

14. An apparatus for managing registration requests from a plurality of devices, the apparatus comprising:
an interface operable to receive a token request from a device, the interface further operable to receive a token registration request from the device;
a processor operable to determine a registration load on a controller, the processor further operable to grant a token to the device in response to the registration load, the token authorizing the device to submit the token registration request; and
a registration queue operable to store the token registration request upon determining that the device has been granted the token.

15. The apparatus of claim 14, wherein:
the apparatus comprises a call manager operable to maintain a registration table that stores an address mapping for the device upon registration; and
the device comprises a packet-based telephony device managed by the call manager.

16. The apparatus of claim 14, wherein:
the interface receives an initial registration request from a second device; and
the registration queue stores the initial registration request at a lower priority than the token registration request.

17. The apparatus of claim 14, wherein:
the interface receives a priority device registration request from a second device; and
the registration queue stores the priority device registration at a higher priority than the token registration request.

18. The apparatus of claim 14, wherein:
the device comprises a first packet-based telephony device;
the interface receives an initial registration request from a second packet-based telephony device and a priority device registration request from a telephony gateway device; and
the registration queue stores the initial registration request at a lower priority than the token registration request and the priority device registration request at a higher priority than the token registration request.

19. The apparatus of claim 14, wherein the controller processes registration requests stored in the registration queue in priority order and at a rate determined by the processing resources of the controller.

20. The apparatus of claim 14, wherein the registration load comprises at least one of the following:
a processor load of the controller; and a number of registration requests stored on the registration queue.

21. The apparatus of claim 14, wherein:
the token granted to the device includes a timeout; and
the registration queue stores the token registration request if the controller receives the token registration request prior to expiration of the timeout.

22. A method for registering with a controller, the method comprising the following steps performed at a device:
communicating a token request to the controller;
receiving a token from the controller in response to the token request, the token authorizing the device to submit a token registration request;
communicating the token registration request to the controller, the token registration request indicating that the device has received the token from the controller; and
receiving a registration acknowledgment from the controller in response to the token registration request.

23. The method of claim 22, further comprising the following steps performed prior to communicating a token request:
determining that the controller is unavailable;
registering with a secondary controller in response to determining that the controller is unavailable; and
determining, while registered with the secondary controller, that the controller has become available.

24. The method of claim 22, wherein:
the controller comprises a call manager operable to maintain a registration table that stores an address mapping for the device upon registration; and
the device comprises a packet-based telephony device managed by the call manager.

25. The method of claim 22, further comprising the following steps performed prior to communicating a token request:
configuring the device;
communicating an initial registration request to the controller;
registering with the controller in response to the initial registration request;
determining that the controller is unavailable;
registering with a secondary controller in response to determining that the controller is unavailable; and
determining, while registered with the secondary controller, that the controller has become available.

26. The method of claim 22, wherein configuring the device comprises:
detecting a network connection;
requesting a device address;
receiving the device address;
requesting configuration information;
receiving configuration information; and
configuring the device.

27. The method of claim 22, wherein:
the device comprises a packet-based telephony device; and
configuring the packet-based telephony device comprises:
detecting a network connection;
broadcasting a request to receive a device address;
receiving the device address from a dynamic host configuration protocol (DHCP) server;
requesting configuration information using a resource address;
receiving configuration information comprising line assignments; and
configuring the device using the line assignments.

28. The method of claim 22, wherein determining, while registered with a secondary controller, that the controller has become available comprises:
periodically and repeatedly communicating a message to the controller; and
determining that the controller has become available if the controller acknowledges the message.

29. The method of claim 22, wherein communicating a token request, comprises:
communicating a prior token request;
receiving a response denying the prior token request, the response having a retry time; and
communicating a token request after expiration of the retry time.

30. The method of claim 22, wherein:
the token granted to the device includes a timeout; and
receiving a registration acknowledgment from the controller occurs if the controller receives the token registration request prior to expiration of the timeout.

31. Logic for managing registration requests from a plurality of devices, the logic encoded in a medium and operable when executed by a controller to:
receive a token request from a device;
determine a registration load on the controller;
grant a token to the device in response to the registration load, the token authorizing the device to submit a token registration request;
receive the token registration request from the device; and
store the token registration request in a registration queue upon determining that the device has been granted the token.

32. A controller for managing registration requests from a plurality of devices, the controller comprising:
means for receiving a token request from a device;
means for determining a registration load on the controller;
means for granting a token to the device in response to the registration load, the token authorizing the device to submit a token registration request;
means for receiving the token registration request from the device; and
means for storing the token registration request in a registration queue upon determining that the device has been granted the token.

* * * * *